Sept. 25, 1928.　　　　　A. F. MARK　　　　　1,685,198
HUMIDIFIER
Filed June 5, 1926　　　　2 Sheets-Sheet 1

A. F. Mark
Inventor

By C. A. Snow & Co.
Attorneys.

Sept. 25, 1928.  
A. F. MARK  
HUMIDIFIER  
Filed June 5, 1926  
1,685,198  
2 Sheets-Sheet 2
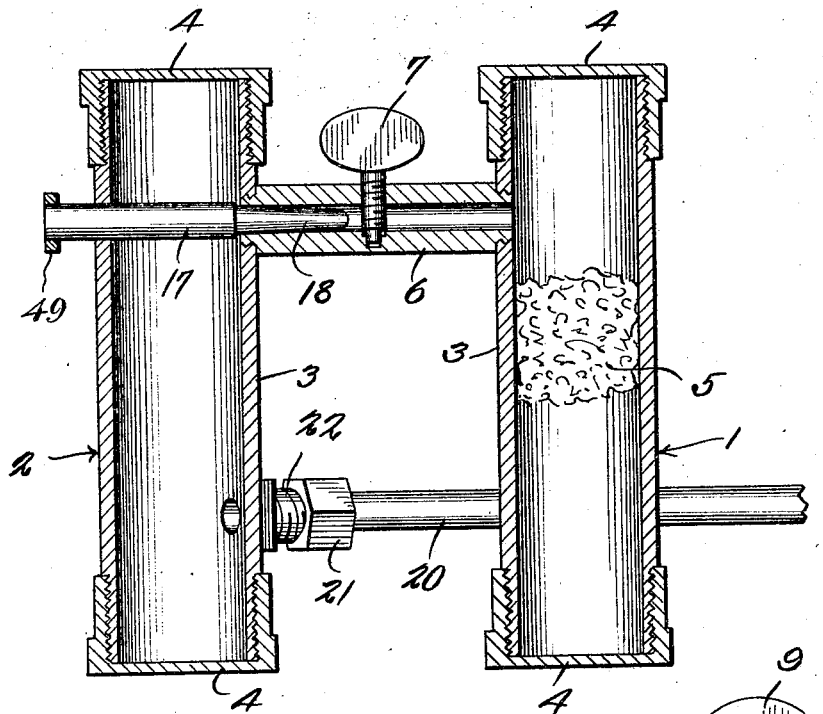
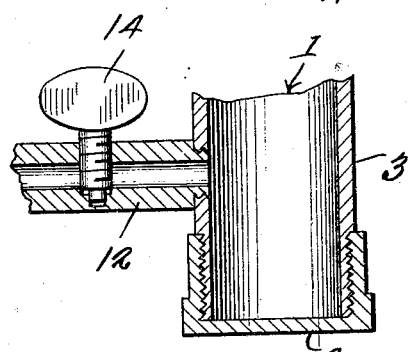
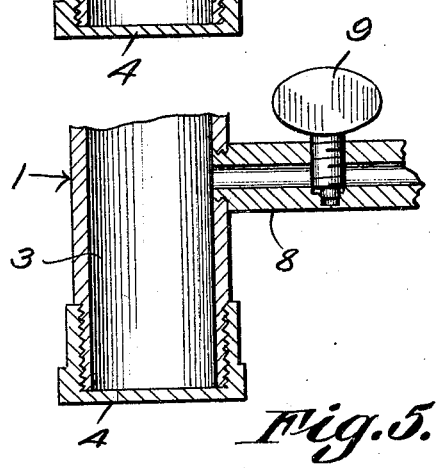
A. F. Mark
Inventor,
By C. A. Snow & Co.
Attorneys.

Patented Sept. 25, 1928.

1,685,198

UNITED STATES PATENT OFFICE.

ABRAHAM F. MARK, OF CEDAR RAPIDS, IOWA.

HUMIDIFIER.

Application filed June 5, 1926. Serial No. 114,022.

This invention aims to provide novel means for supplying a charge of warm moist air through any desired part of the fuel inlet system of an internal combustion engine.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the drawings:—

Figure 3 is a section on the line 3—3 of Figure 2;

Figure 4 is a section on the line 4—4 of Figure 2;

Figure 5 is a section on the line 5—5 of Figure 2.

Figure 1:
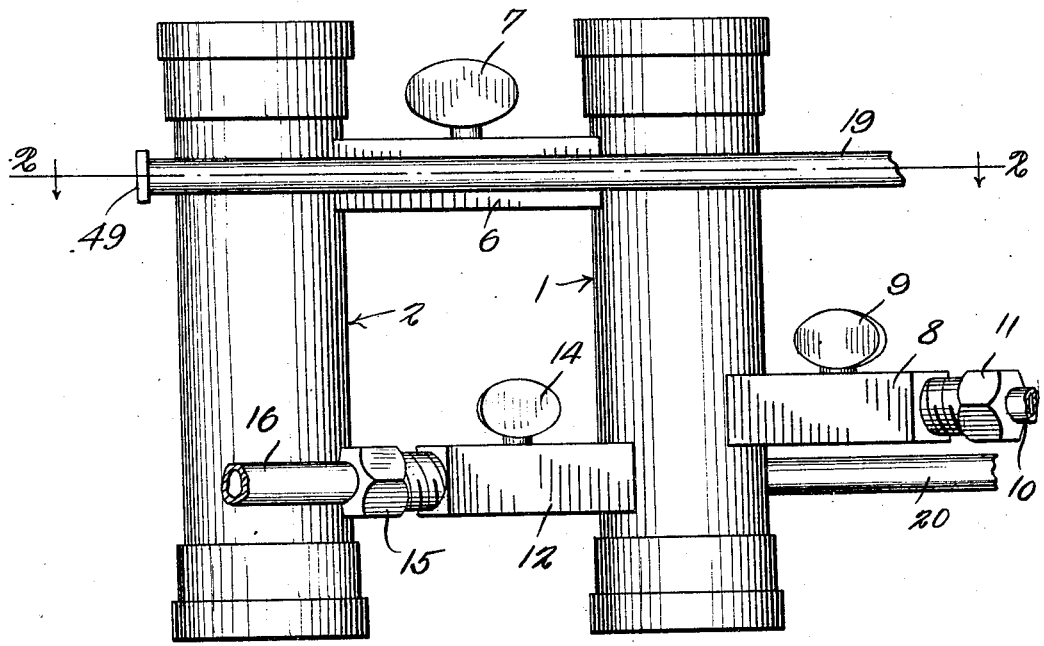
Figure 1 shows in elevation, a device constructed in accordance with the invention.
Figure 2:
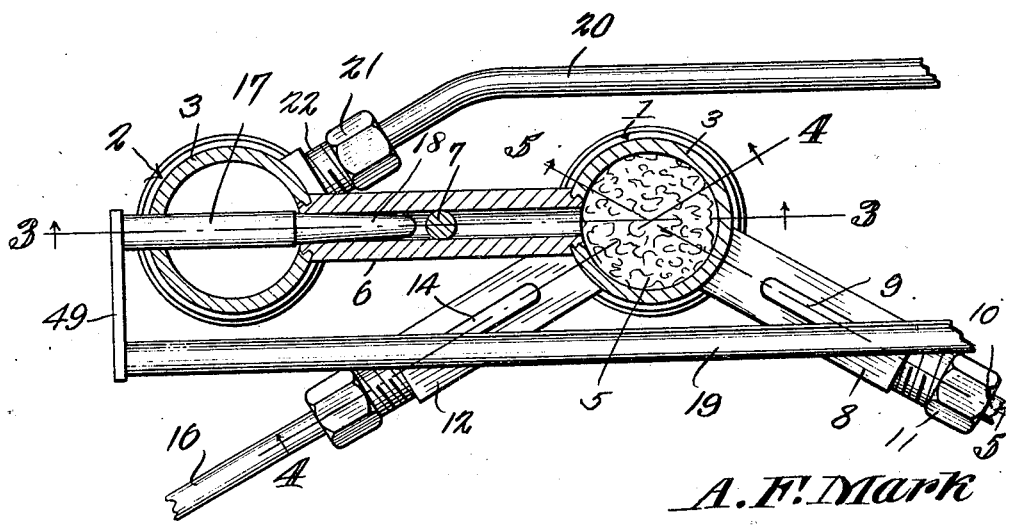
Figure 2 is a section on the line 2—2 of Figure 1.

The device forming the subject matter of this application includes a delivery chamber 2 and a mixing chamber 1. Each of the chambers 1 and 2 comprises a tubular body 3, on the ends of which caps 4 are detachably threaded. A quantity of filtering material 5 may be mounted in the mixing chamber 1, there being as much or as little of the filtering material as occasion may demand. Near to their upper ends, the mixing chamber 1 and the delivery chamber 2 are joined by a connection 6 the bore of which is governed by a valve 7 under the control of an operator and threaded into the connection 6.

An arm 8 communicates with the mixing chamber 1 near to the lower end of the mixing chamber, the bore of the arm being under the control of a valve 9, constructed preferably like the valve 7. A pipe 10 is joined by a union 11 through the arm 8 and is adapted to supply moist air to the mixing chamber 1 by way of the arm 8. The pipe 10 may receive moist air from the overflow pipe of the radiator of an internal combustion engine (not shown) or from any other appropriate source. Near to its lower end, a mixing chamber 1 has an arm 12 in which operates a valve 14 constructed like the valve 7. A union 15 joins the arm 12 to a pipe 16, the pipe 16 delivering the warm air into the mixing chamber 1 through the arm 12. The air in the pipe 16 may be warmed from the exhaust or in any other suitable way.

A valve 17 slides in the tubular body 3 of the delivery chamber 2 and includes a tapered part 18 received in one end of the bore of the connection 6. The valve 17 is provided at its outer end with a transverse head 49 carrying a connection 19 whereby the valve 17 may be operated in consonance with the operation of a carburetor, by the throttle, or otherwise. A discharge pipe 20 is connected by a union 21 to a nipple 22 on the lower portion of the tubular body 3 of the delivery chamber 2. The pipe 20 may discharge into the intake manifold of an internal combustion engine.

The device operates responsive to engine suction. The amount of moist air supplied is regulated by the valve 9, and the amount of hot air supplied is governed by the valve 14. The moist air and the hot air mix in the chamber 1 and pass upwardly through the filtering material. The air, then passes through the connection 6, a fixed adjustment being afforded by means of the valve 7, and it being possible to manipulate the valve to cut off the flow of air through the connection 6 entirely. The connection 19 and the head 49 move the valve 17 different amounts, depending upon the speed at which the engine is running, this observation being true because the rod 19 is connected to the throttle or to some part of the fuel control of the carburetor. When the valve 17 is shifted as aforesaid, the tapered part 18 of the valve 17 is moved in the bore of the connection 6, and more or less of the mixture of hot air and moist air passes into the delivery chamber 2, the mixture of moist air and hot air passing by way of the pipe 20 to the place of which, generally, is the intake manifold of an internal combustion engine.

The device is simple in construction, but it affords an effective means whereby a supply of moist and hot air, duly governed, may be delivered into the fuel line of an internal combustion engine.

What is claimed is:—

In a humidifying device for internal combustion engines, approximately parallel adjacently-spaced first and second tubes, the first tube being provided with a lateral moist air inlet and with a lateral hot air inlet, the second tube having a lateral outlet, means for connecting the intake manifold of an internal combustion engine with the outlet, a connecting member joined at its ends to the tubes and having a bore which establishes communication between the tubes, a needle valve operating in one end of the bore of the connecting member and extended across the second tube, means connected to the needle valve at a point external to the second tube for operating the needle valve from a distance, a valve controlling each inlet and under the governance of an operator, and closures removably mounted on the ends of the tubes.

In testimony that I claim the foregoing as my own, I have hereto affixed my signature.

ABRAHAM F. MARK.